Aug. 6, 1935.   T. A. SCHWAMB ET AL   2,010,567
CARD CUTTING MACHINE
Filed May 31, 1933   10 Sheets-Sheet 1

INVENTORS:
Theodore A. Schwamb
Sidney P. Smith
by Macleod, Calver, Copeland & Dike
Attys.

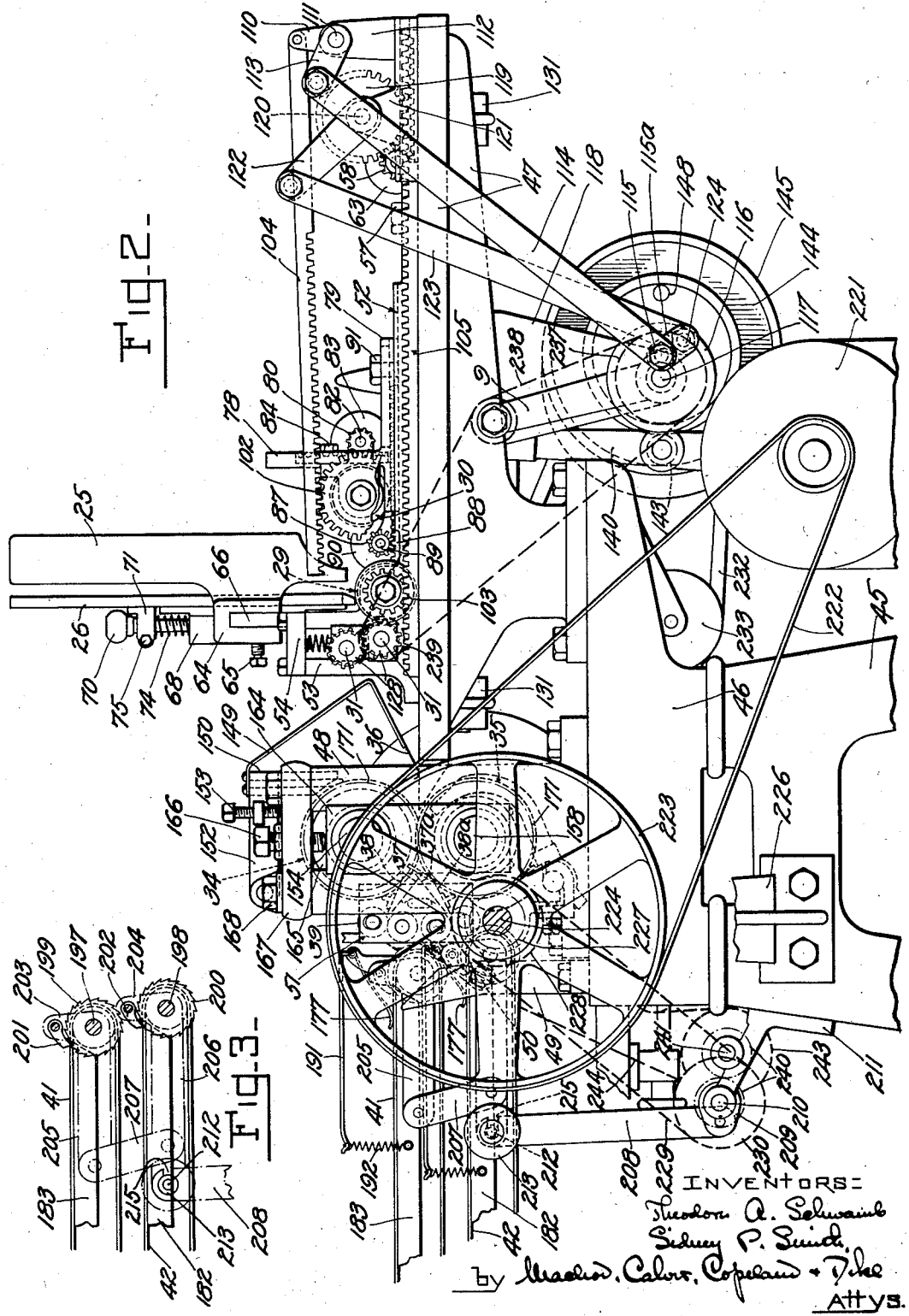

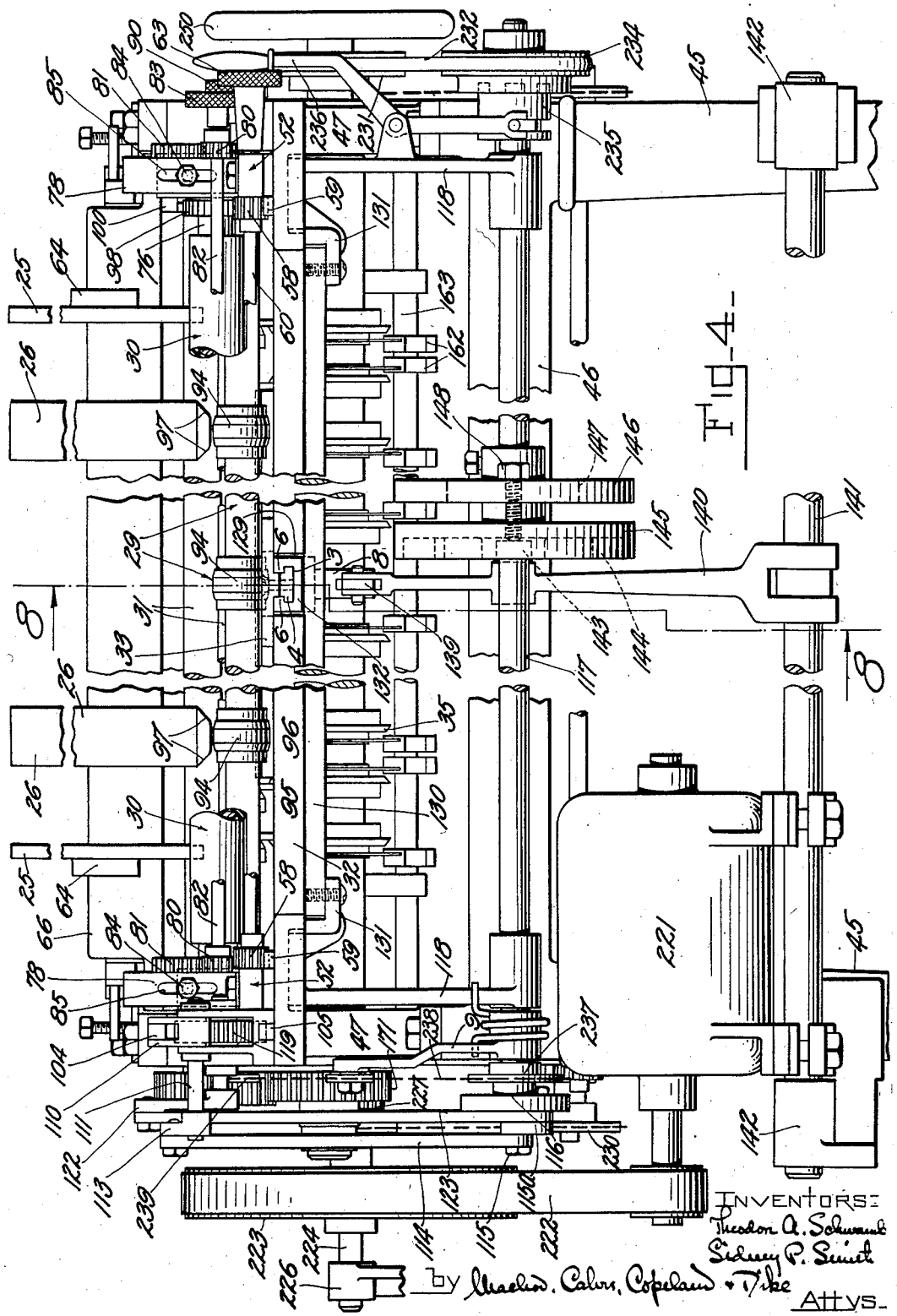

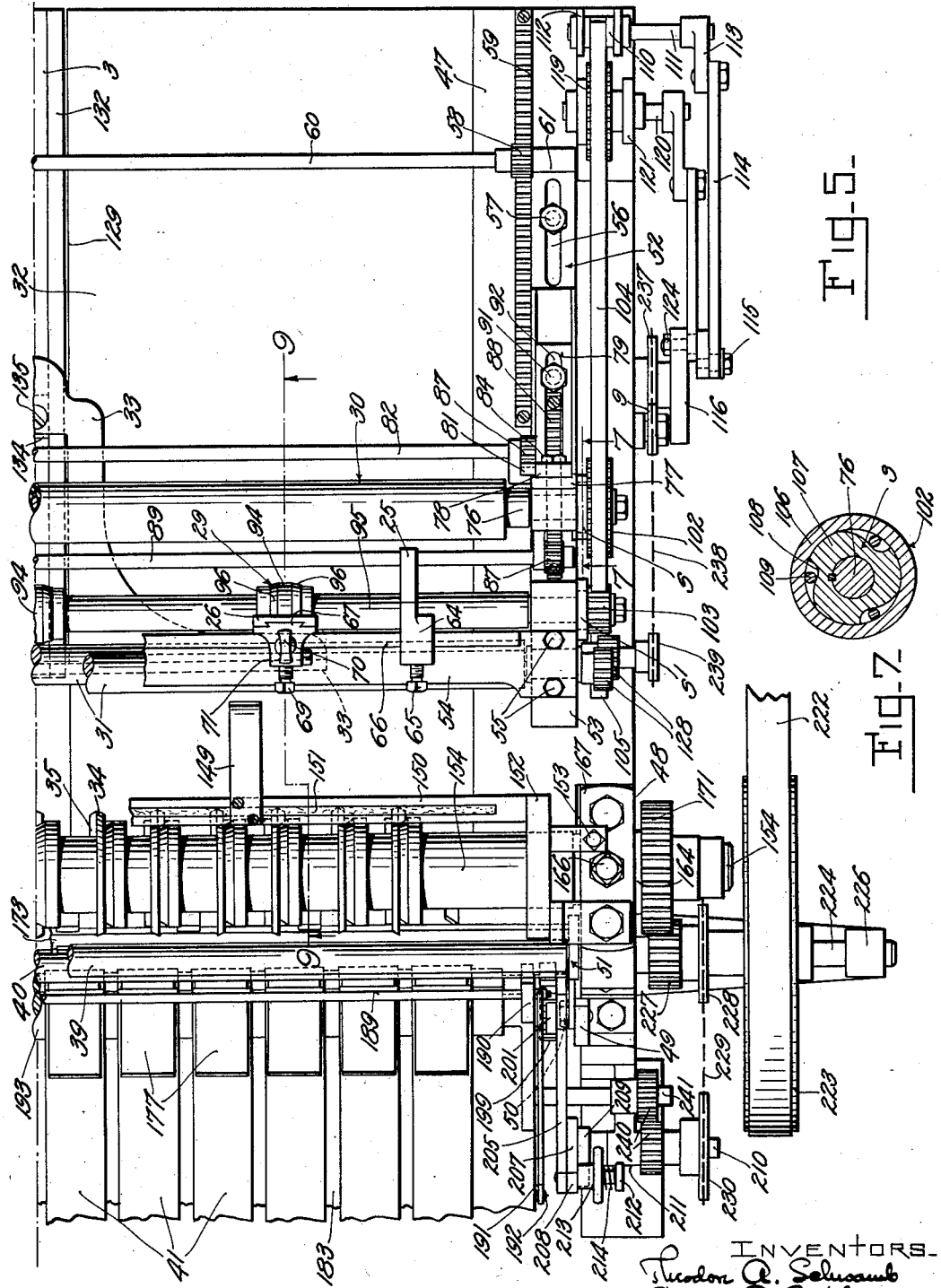

Aug. 6, 1935.  T. A. SCHWAMB ET AL  2,010,567
CARD CUTTING MACHINE
Filed May 31, 1933    10 Sheets-Sheet 5

INVENTORS:
Theodore A. Schwamb
Sidney P. Smith
By Macleod, Calver, Copeland & Dike
Attys.

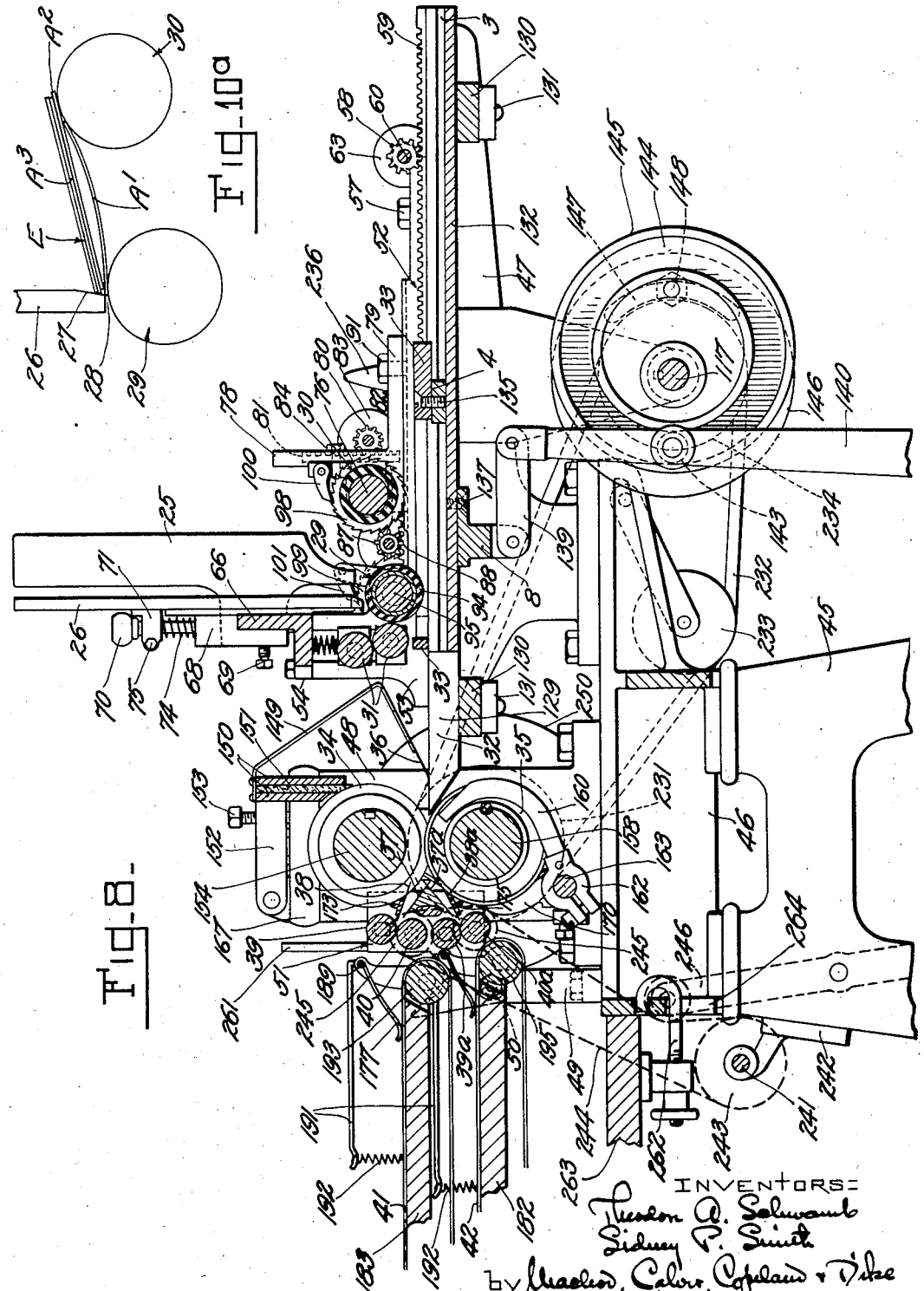

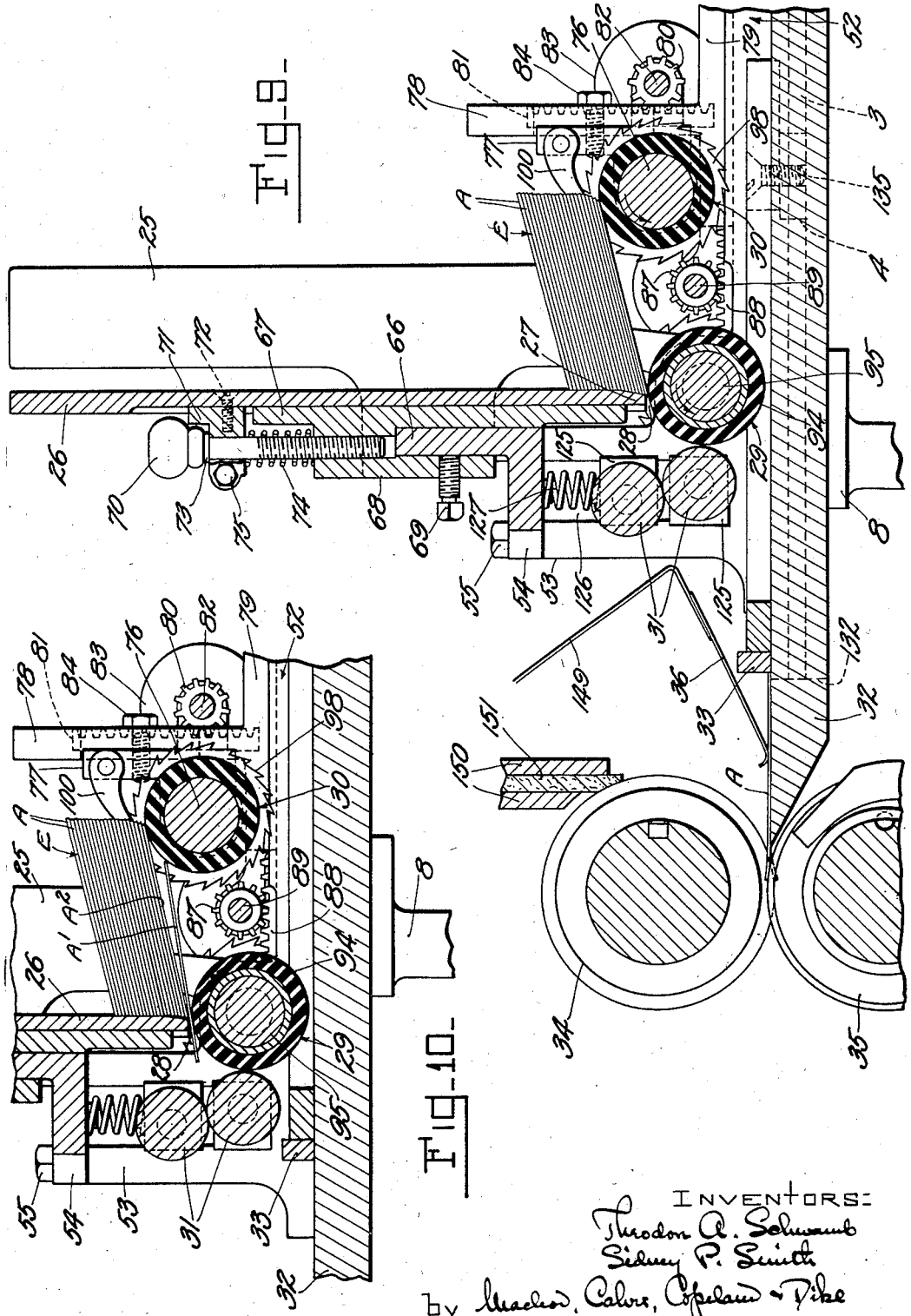

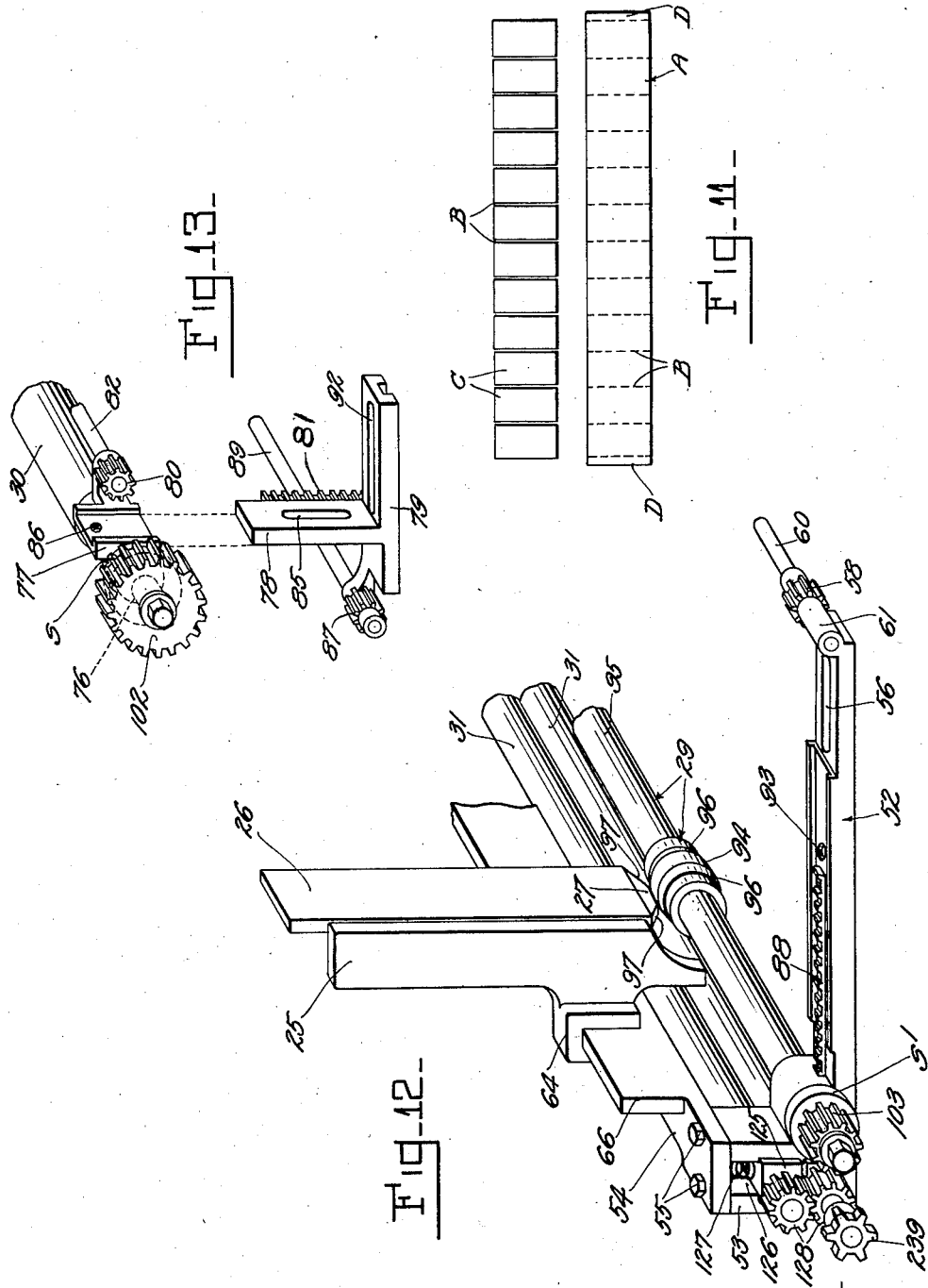

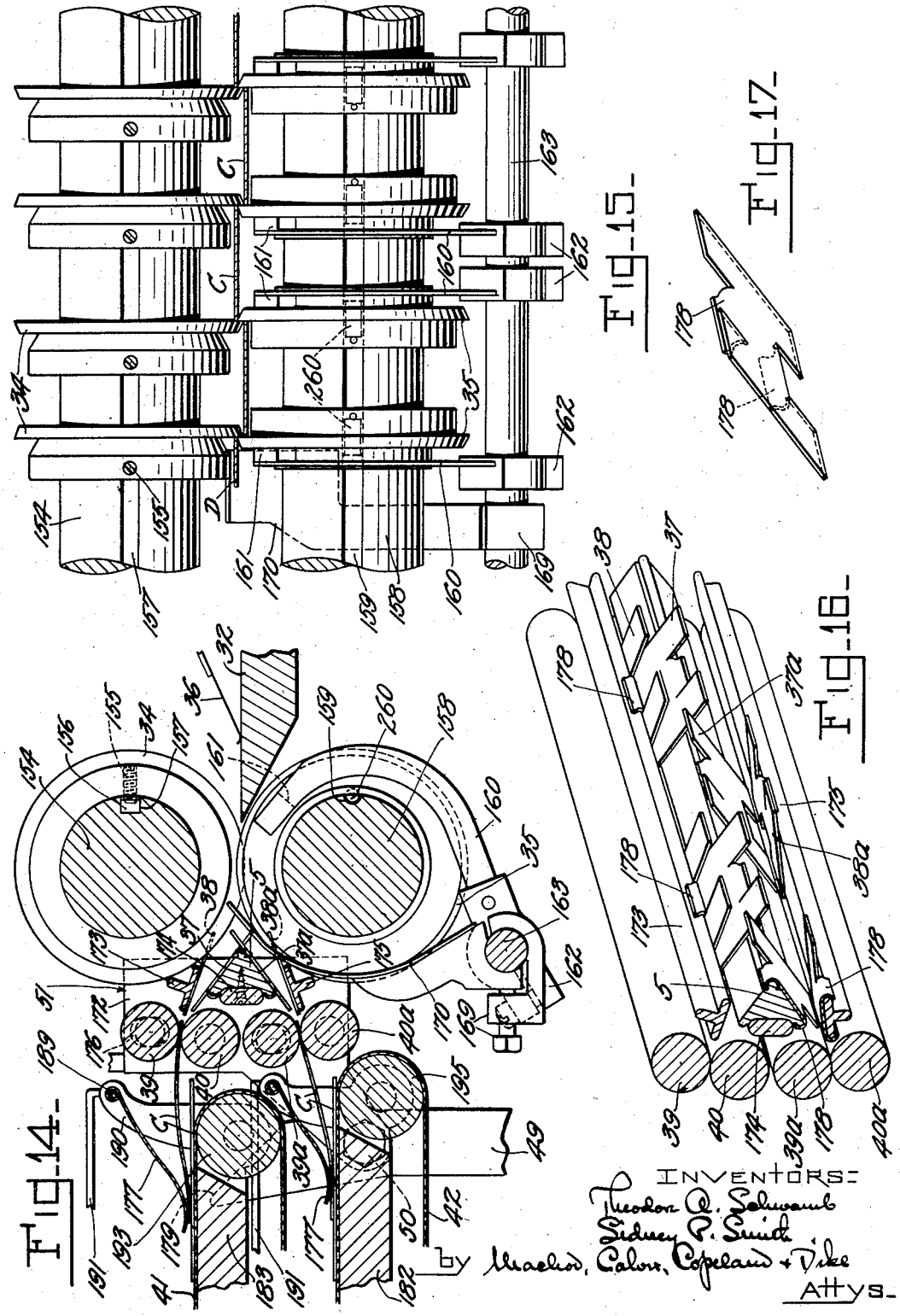

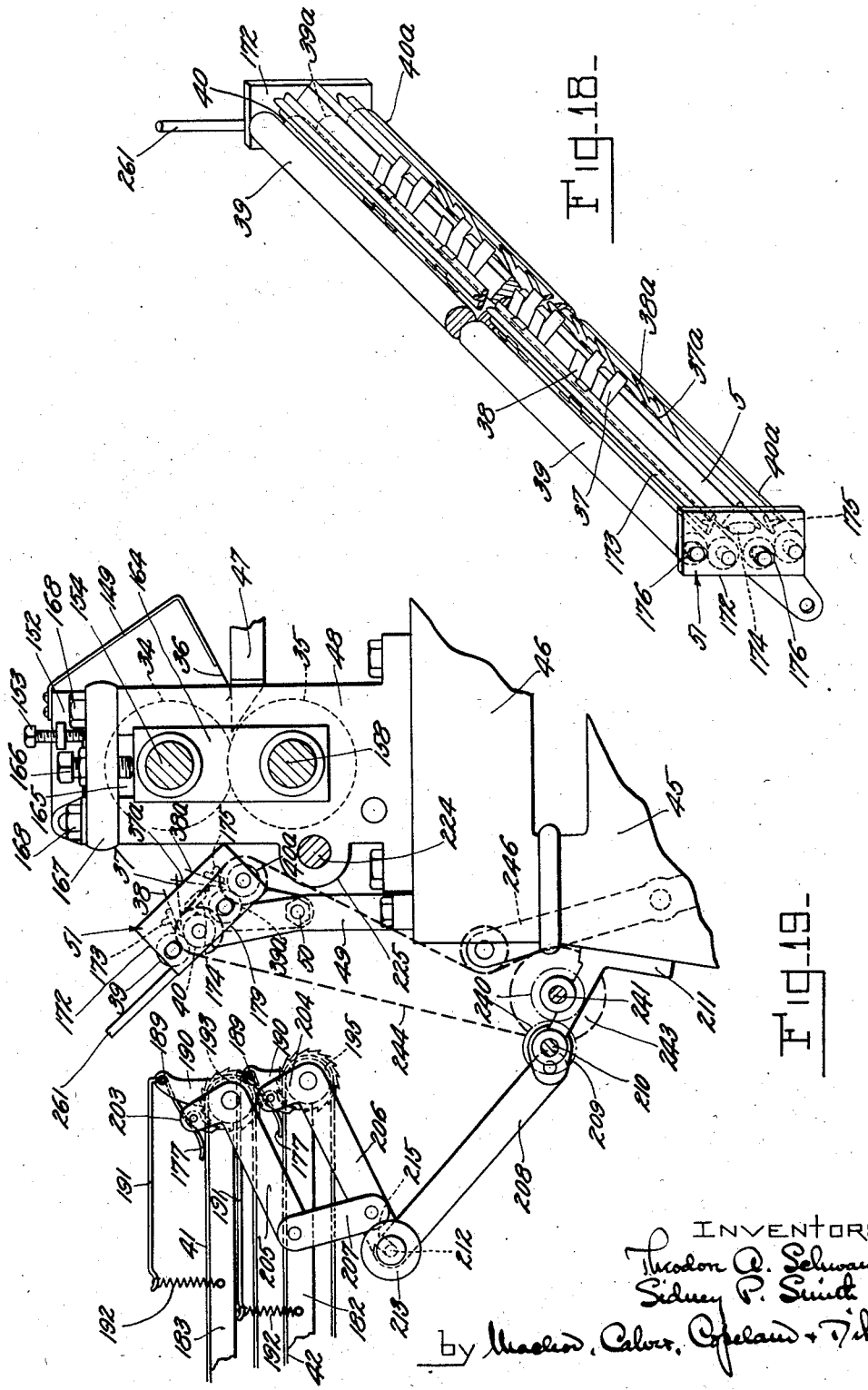

Patented Aug. 6, 1935

2,010,567

UNITED STATES PATENT OFFICE 2,010,567

CARD CUTTING MACHINE

Theodore A. Schwamb, Boston, Mass., and Sidney P. Smith, Norwichtown, Conn., assignors to John T. Robinson Company, Boston, Mass., a corporation of Massachusetts Application May 31, 1933, Serial No. 673,692

18 Claims. (Cl. 164—61)

This invention relates to card cutting machines of the type employing a plurality of pairs of rotary cutters for dividing strips of card stock transversely into individual cards.

In the operation of machines of this character, since the clearance between the individual cards into which the strip is divided is negligible, difficulties are encountered in the feeding and handling of the cards subsequent to the cutting operation, due to the tendency of the edges of adjacent cards to contact with or overlap one another, thus interfering with the smooth delivery of the cards in regular lines and their even stacking. The present invention has, therefore, for an object to overcome this difficulty, and to this end contemplates the provision of means whereby adjacent cards, as they are cut, are alternately guided or deflected into different paths, preferably at different elevations, along which they pass to separate delivery and stacking instrumentalities, thereby effectually preventing the accidental interengagement of the edges of cards in adjacent lines, since the lines of cards travelling in a given path are spaced apart a distance equal approximately to the width of the cards.

Other objects of the invention are to provide a completely automatic machine of this type capable of successively feeding stock strips from a stack in a suitable hopper to the cutters and delivering the cut cards in a convenient arrangement for subsequent handling; to provide feeding, cutting and delivery mechanisms which can be readily adjusted to adapt the machine to the cutting of cards of a wide variety of sizes; to provide feeding mechanism which may be adjusted in accordance with the thickness and surface characteristics of the stock and which is otherwise well adapted to the accurate and reliable feeding of the strips; and to provide means for accurately and automatically squaring the strips with the cutters prior to their presentation thereto.

The foregoing and other objects of the invention, together with means whereby the latter may be carried into effect, will best be understood from the following description of a preferred embodiment thereof illustrated in the accompanying drawings. It will also be understood, however, that the particular construction described and shown has been chosen for purposes of exemplification merely, and that the invention, as defined by the claims hereunto appended, may be otherwise embodied without departure from the spirit and scope thereof.

In said drawings:

Fig. 2 is a similar view on an enlarged scale of a part of the mechanism shown at the right in Fig. 1.

Fig. 3 is a fragmentary detail view of the receiving end of the collecting mechanism.

Fig. 4 is a front elevation, partly broken away.

Figs. 5 and 6 are plan views of the left and right halves, respectively, of the portion of the machine shown in Fig. 2.

Fig. 7 is a detail section taken substantially on the line 7—7, Fig. 5.

Fig. 8 is a longitudinal section taken substantially on the line 8—8, Fig. 4.

Fig. 9 is an enlarged detail sectional view, taken on substantially the line 9—9, Fig. 5, of the stock supplying mechanism, and illustrating the delivery of the card stock strips to the cutting mechanism.

Fig. 10 is a similar view illustrating the feed of the card stock strips from the stack.

Figure 1:
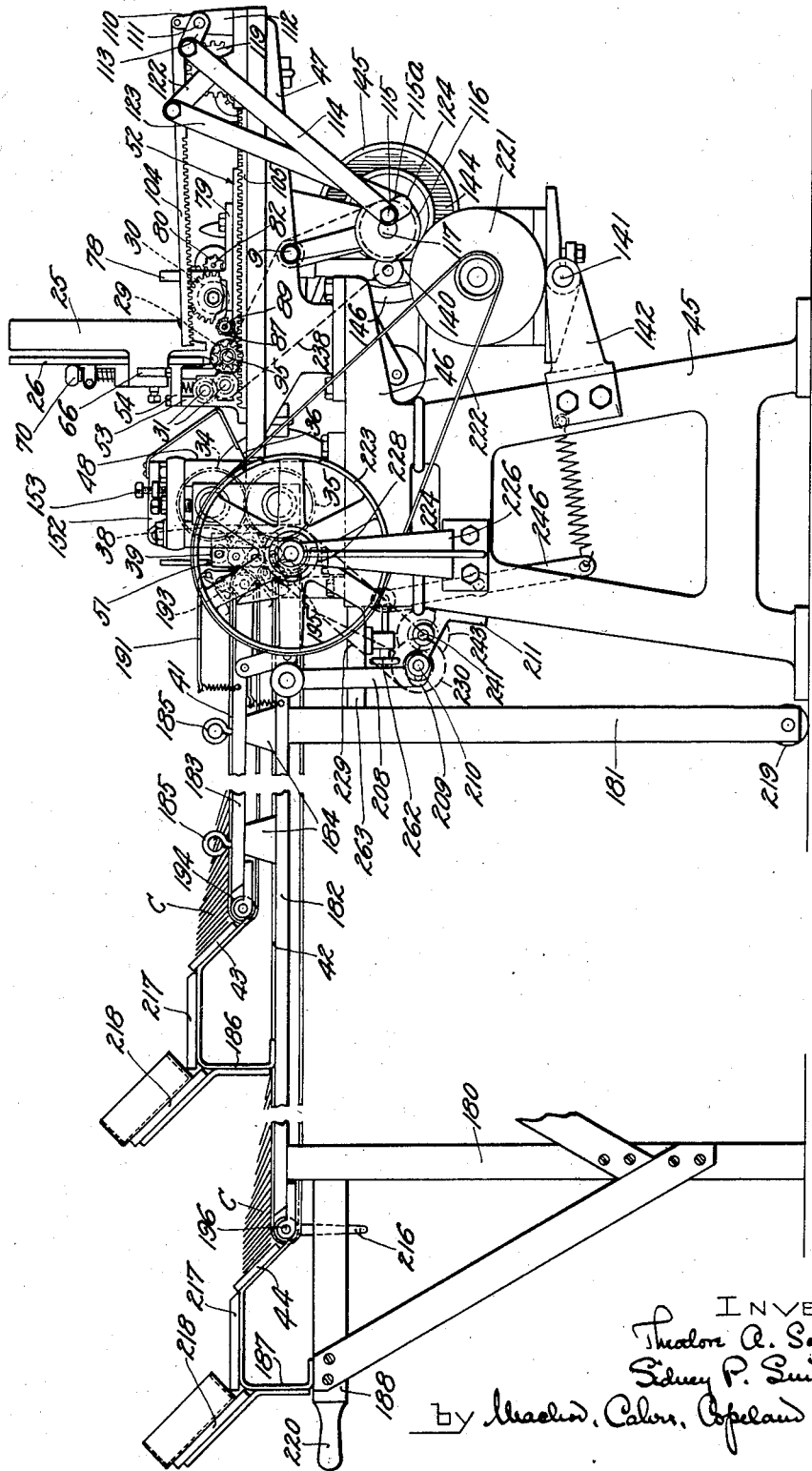
Fig. 1 is a side elevation of substantially the complete machine.
Figure 6:
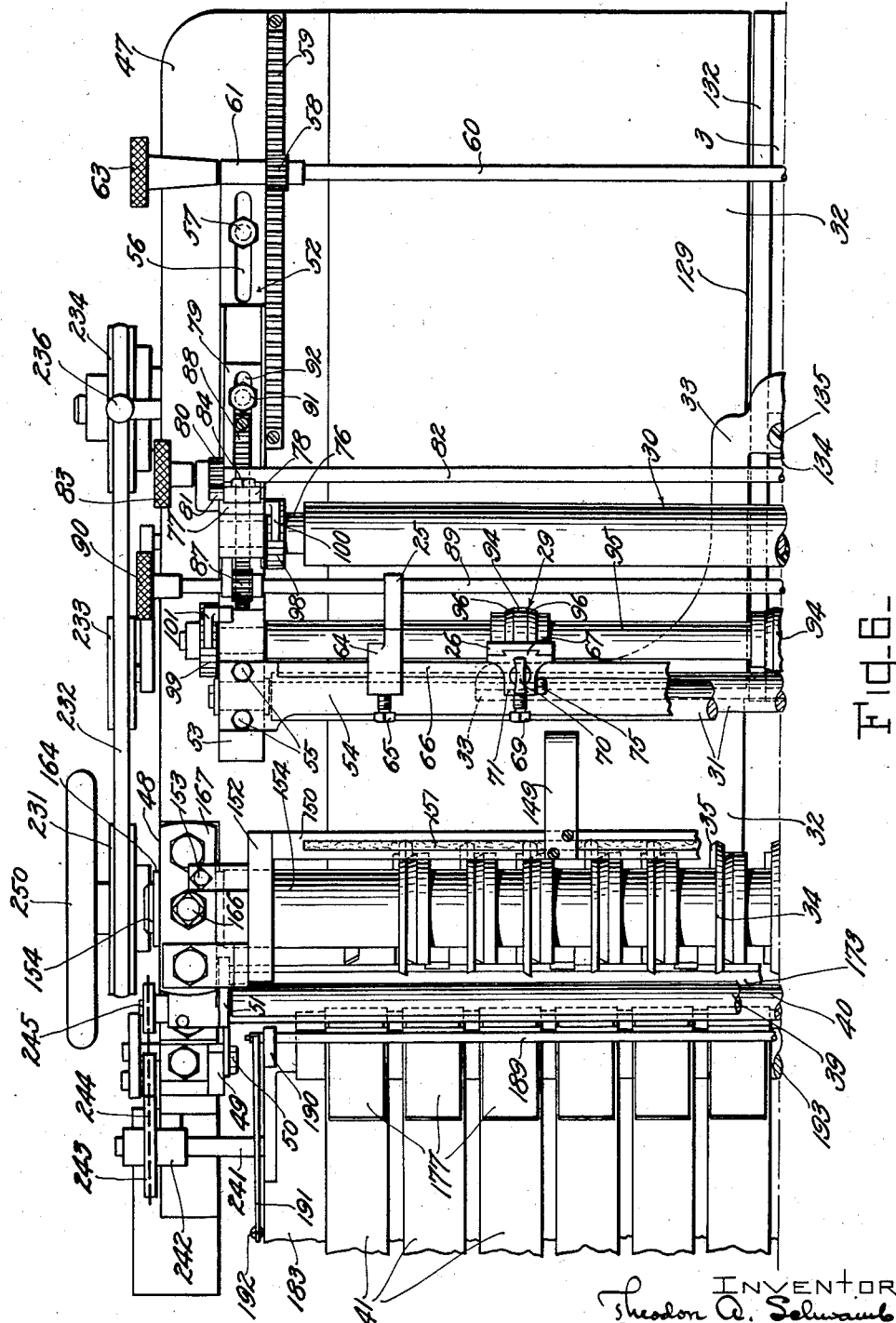

Fig. 10ª is a similar, but fragmentary and somewhat diagrammatic view, further illustrating the operation.

Fig. 11 is a diagrammatic view illustrating the work done by the machine.

Fig. 12 is a fragmentary detail perspective view of portions of the strip supplying mechanism and the auxiliary frame by which they are carried.

Fig. 13 is a similar view of other parts of said mechanism, showing certain of said parts disconnected, and illustrating particularly the means for adjusting one of the combined stock supporting and feed rollers.

Fig. 14 is an enlarged, fragmentary, substantially central horizontal sectional view of the cutting instrumentalities and associated delivery mechanism.

Fig. 15 is a fragmentary front elevation of the cutting instrumentalities.

Fig. 16 is a fragmentary perspective view of the deflectors and delivery rolls.

Fig. 17 is a detail perspective view of one of the deflector plates.

Fig. 18 is a detail perspective view of the delivery unit.

Fig. 19 is a fragmentary side elevation of parts of the cutting, delivery, and collecting mechanisms, illustrating the separation of the parts for the purpose of adjusting the machine to cards of different widths.

As illustrated in Fig. 11, the cardboard stock is, prior to its presentation to the machine, cut by any suitable means into strips A of a width usually corresponding to the length of the desired cards. These strips are fed laterally, or in the direction of their width, to the cutting instrumentalities of the machine which divide said strip along lines B, spaced in accordance with the desired width of the cards, into individual cards C, a certain amount of scrap or waste D being usually trimmed from the ends of the strip.

For convenience of description, the general organization of the machine and the functions and cooperative relationship of the several instrumentalities will first be outlined, after which the preferred construction of the several instrumentalities individually, as well as their supports and actuating connections, will be described more in detail.

Referring to Figs. 9 and 10, the strips A are supplied in a stack E to a hopper comprising a pair of end uprights 25 (see also Figs. 1, 2, 4, 5, 6 and 8) and a suitable number of side or rear uprights in the form of gates 26, the latter having outwardly bevelled lower ends 27, rounded at their forward edges. Spaced from the lower ends of the gates 26 a distance approximately equal to the thickness of the strip A, in order to form a discharge opening 28 for single strips, is a feed roller 29 upon which the adjacent edge of the stack E is supported. The width of the discharge opening 28 is preferably slightly less than the thickness of the strips, the roller 29 having a yielding surface permitting the forcing of the strips through said opening. The opposite edge of the stack is supported by a second feed roller 30. The feed rollers 29 and 30 are positively and intermittently rotated in the direction indicated by the arrows on Fig. 9 and operate to feed the strips A successively from the bottom of the stack through the feed opening 28 to a pair of feed rollers 31 which deliver them to a feed table 32 over which operates a pusher 33. The plane of the axes of the rollers 31 is inclined rearwardly to the vertical in order to facilitate the transfer of the strips A from the feed opening 28 to the table 32 which is located at a lower level.

At the rear end of the table 32 are the cutting instrumentalities which, as shown most clearly in Figs. 9, 14 and 15, comprise two parallel series of co-axial rotary cutters 34 and 35 respectively, the several cutters 34 coacting with the respective cutters 35 to effect a shearing cut and engaging the same alternately at opposite sides, as shown most clearly in Fig. 15. The effect of this arrangement is to cause alternate cards C of the series into which the strips A are cut to be displaced in opposite directions from the original plane of the strip as they are cut.

The pusher 33 reciprocates, in proper time with the strip supplying mechanism, on the table 32 toward and from the cutters, so as to push the strips A, as deposited on said table by the rollers 31, laterally against the cutters, as will appear from Fig. 9. The pusher 33 is formed with a straight rear edge parallel to the plane of the axes of the cutters and therefore acts to automatically square the strip with respect to said cutters, that is to say, move the same into a position of accurate parallelism to the axes of the cutters as it is presented thereto, so as to cause said strip to be cut accurately at right angles to its length. In order to insure this squaring operation, a plurality of light spring fingers 36 are provided, which fingers press upon a strip A on the table 32 and yieldingly resist the movement of said strip by the pusher, so as to insure engagement of the former by the latter throughout its edge.

Adjacent cards C of the series, which, as above explained, are displaced in opposite directions by the cutters 34 and 35, are directed in different paths by two sets of deflectors 37, 38 and 37a, 38a, respectively, each set comprising an inner series 37 or 37a and an outer series 38 or 38a. The deflectors 37, 38 and 37a, 38a of the respective sets converge away from the cutters to direct the cards between two sets of delivery rolls 39, 40 and 39a, 40a, respectively, said sets of rolls delivering the cards at different levels, as clearly shown in Fig. 14.

The cards delivered by the two sets of rolls are respectively received, in overlapping relation, as shown in Fig. 14, upon the upper stretches of two endless conveyors 41 and 42 constituting parts of a collecting mechanism and which carry the cards to inclined collecting tables 43 and 44 against which said cards are collected from said upper stretches in inclined superimposed relation, as shown in Fig. 1.

The general organization of the machine having thus been outlined, the construction of the several instrumentalities and their supports and actuating connections will now be described more in detail.

The main frame of the machine comprises a pair of legs 45 connected at their tops by a transverse bed or cap member 46. Mounted on the ends of the bed 46 are brackets 47 which support the feed table 32 and the strip supplying mechanism, including the hopper 25, 26 and the feed rolls 29, 30 and 31. Also rising from the cap member 46 adjacent the ends of the latter are uprights 48, which support the bearings for the cutter shafts, and uprights 49 (see particularly Fig. 19) to which is pivoted, as at 50, an auxiliary frame 51 carrying the delivery mechanism.

The strip supplying mechanism is carried by an auxiliary frame supported on the brackets 47 and adjustable thereon longitudinally of the machine to vary the distance between the feed rolls 31 and cutters 34, 35 in accordance with the width of the strips. Said auxiliary frame comprises side members 52 (see particularly Fig. 12) having at their rear ends upright portions 53 connected by a cross member 54 suitably secured thereto, as by bolts 55. The side members 52 are provided with slots 56 to receive bolts 57 by which said members are secured to the brackets 47, said slots permitting movement of the auxiliary frame longitudinally of the feed table when said bolts are loosened, but said frame being clamped in adjusted position by said bolts when the latter are tightened. This longitudinal adjustment is effected by means of pinions 58 which engage racks 59 on the brackets 47, said pinions being carried by a shaft 60 journalled in bearings 61 in the side members 52 and provided at one end with a hand wheel 63.

The end uprights 25 of the hopper are formed with bifurcated lugs 64 secured by set screws 65 to an upstanding flange 66 on the cross member 54, loosening of said set screws permitting adjustment of said uprights along said flange in accordance with the length of the strips A. The gate members 26 are formed with undercut grooves to receive dovetailed ribs 67 (see particularly Figs. 5, 6 and 9) on bifurcated brackets 68 likewise secured by set screws 69 to the flange 66. Said gates are vertically adjustable on the guide ribs 67, to vary the width of the discharge opening 28 in accordance with the thickness of the stock, by means of adjusting screws 70 (see particularly Fig. 9) having threaded engagement at their lower ends with the brackets 68 and swiveled adjacent their upper ends in lugs 71 secured, as by screws 72, to the gate members 26. The adjusting screws 70 are formed with shoulders 73 against which the lugs 71 are held by springs 74 interposed between said lugs and the brackets 68. The lugs 71 are preferably split and provided with clamping screws 75 whereby the parts may be secured in adjusted position.

As shown most clearly in Figs. 8 and 9, the feed roller 30 preferably comprises a cylinder of rubber or other friction material mounted on a shaft 76 which is journalled adjacent its ends in slides 77 (see particularly Figs. 9 and 13) guided for vertical movement on upright portions 78 of slides 79 which in turn are guided for horizontal movement on the side members 52. The slides 77 are vertically adjustable on the upright portions 78 by means of pinions 80 which engage racks 81 on said upright portions, said pinions being carried by a transverse shaft 82 journalled at its ends in the slides 77 and provided at one end with a hand wheel 83. The slides 77 are secured in adjusted position by means of clamp screws 84 which pass through slots 85 in said upright portions and engage threaded openings 86 in said slides. The slides 79 are horizontally adjustable on the side members 52 by means of pinions 87 which engage racks 88 on said side members, said pinions being carried by a cross shaft 89 journalled in suitable bearings on the slide 79 and provided at one end with a hand wheel 90. Said slides 79 are secured in adjusted position by means of clamp screws 91 which pass through slots 92 in said slides and engage threaded openings 93 in said side members. The horizontal adjustment of the slides 79 serves to adjust the feed roller 30 toward and from the feed roller 29 in accordance with the width of the strips A. The adjustment of the slides 77 on the uprights 78 serves to adjust the roller 30 vertically with respect to the roller 29 to vary the inclination from the horizontal at which the strips are supported in accordance with the frictional character of the surface of the stock, it having been found that for the accurate and reliable feeding of the strips a relatively steeper inclination is desirable in the case of stock having a relatively smooth finish than in the case of stock having a relatively rough finish.

The feed roller 29 comprises a series of rings 94 of rubber or other suitable yielding frictional material mounted on a shaft 95 journalled at its ends in suitable bearings in the side members 52 at the bases of their upright portions 53. The rings 94 may correspond in number and spacing to the gate members 26 but as herein shown an additional ring is provided intermediate said gate members. The rings 94 are preferably bevelled at their edges as shown at 96, the gate members being correspondingly bevelled as indicated at 97, preferably with rounded edges, whereby the strips are engaged by said rings and gates along relatively narrow paths, it having been found in practice that a more accurate and generally satisfactory feeding of the strips is effected in this way, particularly in case of a strip which is slightly out of position or is warped out of its truly plane form.

At one side of the machine the shafts 76 and 95 of the feed rollers 30 and 29 are provided with ratchets 98 and 99, respectively with which cooperate holding pawls 100 and 101 pivoted to suitably fixed parts of the machine, whereby said rollers are held against retrograde rotation. At the opposite side of the machine said shafts 76 and 95 have loosely mounted thereon pinions 102 and 103 which mesh respectively with racks 104 and 105. The pinions 102 and 103 are connected with their respective shafts by one-way clutches $s$ and $s'$ respectively which may be of any suitable type such, for example, as that shown in Fig. 7, wherein 106 represents a hollow hub on the pinion, 107 a disk fast on the shaft and having in its periphery cam recesses 108, and 109 rollers in the recesses adapted to be wedged against the interior surface of the hub 106 when the latter is rotated in one direction or to be forced into the notches 108 when the pinion is rotated in the opposite direction.

Referring particularly to Fig. 2, the rack 104 is pivoted at its end to an arm 110 on a rock shaft 111 journalled in a bracket 112 on one of the brackets 47, said rock shaft having a second arm 113 connected by a link 114 with a crank pin 115 rigidly connected by a crank arm 115a with a second crank pin 124 on a crank disk 116, the latter being fast on the end of a cam shaft 117 extending transversely of the machine and journalled in bearings in brackets 118 depending from the brackets 47. The rack 105 meshes with a pinion 119 on a shaft 120 journalled in a bracket 121 on the aforesaid bracket 47, said shaft having an arm 122 connected by a link 123 with the crank pin 124. By the mechanism above described, the feed rollers 29 and 30 are intermittently rotated in the same direction, as indicated by the arrows on Fig. 9, the arrangement and proportion of the parts being such that the rotation of the feed roller 30 commences prior to or in advance of that of the feed roller 29, while the latter roller when started, is preferably rotated at a slightly greater peripheral speed than the roller 30. The intitial rotation of the roller 30, by surface engagement with the bottom strip of the stack as shown in Fig. 9, causes the rear edge of said strip to be forced toward the discharge opening 28 where it is momentarily held, due to the restricted size of said opening as above described. Continued rotation of the roller 30 causes said bottom strip to be slightly buckled, as shown at A' in Fig. 10a, thereby affording a surface engagement between said roller and the next adjacent strip to force the rear edge of the latter against the bevelled ends 27 of the gates 26, particularly if said next adjacent strip be slightly displaced forwardly, as shown at $A^2$ in Fig. 10a. The action last referred to prevents jamming of the strips in the feed opening, or the feeding of more than one strip at a time, as might be the case were the rear edge of the next strip above, designated at $A^3$ in Fig. 10a, be permitted to engage the periphery of the roller 29 and enter the feed opening in advance of the strip $A^2$. Thereafter the rotation of the roller 29 commences, and the rear edge of the strip $A^1$ is forced through the feed opening 28 by the combined surface engagement therewith of the roller 29 and the wedging or pushing action of the roller 30, as shown in Fig. 10, the rings 94 yielding radially to permit this. The rotation of the roller 29 continues until the rear edge of the strip $A^1$ is engaged by the feed rollers 31 which thereafter take up the feed, this being permitted, after the positive rotation of the roller 29 is completed, by the one-way or overrunning clutch s'.

It will be seen that the action of the roller 30 upon the lowermost strips of the stack is to force and hold the rear edges of said strips in engagement with the bevelled ends 27 of the gates 26, thereby feathering the stack and facilitating the feeding operation above described.

The feed rollers 31 are journalled in boxes 125 mounted in slots 126 in the upright portions 53 of the side members 52. The boxes for the lower roller rest in the bottoms of the slots, and those for the upper roller are pressed downwardly against those for the lower roller by springs 127 interposed between them and the ends of the cross member 54. Said rollers are connected for rotation in opposite directions by gears 128.

The feed table 32 is supported from the brackets 47 and is in two sections leaving between them a central, longitudinally extending slot 129, said sections being supported at their front and rear ends by cross members 130 carried by brackets 131, (see particularly Fig. 4) depending from the brackets 47.

Referring particularly to Figs. 4, 5, 6 and 8, the pusher 33 is carried by a slide 132 working in the slot 129, said slide having an undercut groove 3 which receives a block 4 connected by a screw 135 with the rear end of the pusher 33, the latter being guided on the upper surface of the feed table 32. The screw 135 serves to clamp the overhanging lips 6 of the groove 3 between the pusher 33 and the block 4, thereby securing the pusher to the slide 132. By loosening the screw 135 the pusher 33 can be adjusted longitudinally of the slide 132 in accordance with the width of the strips A and the adjustment above described of the strip supplying mechanism.

Secured, as by screws 137, to the underside of the slide 132 is a lug 8 connected by a link 139 with the upper end of a lever 140 pivoted at its opposite end to a rod 141 extending transversely of the machine and supported at its ends in brackets 142 (Figs. 1 and 4) projecting from the legs 45. The lever 140 is provided intermediate its ends with a cam roller 143 which cooperates with a path 144 in a cam 145 loose on the cam shaft 117. Fast on said cam shaft is a disk 146 provided with an arcuate slot 147 to receive a screw 148 having its end in threaded engagement with the cam 145. By tightening the screw 148 the cam 145 is clamped to the disk 146 for rotation therewith and with the cam shaft 117, while by loosening said screw the angular position of the cam 145 on the cam shaft, and consequently the time of reciprocation of the slide 132 and pusher 33, can be adjusted to compensate for varying widths of strips.

The spring fingers 36 are carried by arms 149 depending from a cross bar 150 which may, if desired, carry a lubricating strip 151 for the upper cutters 34. The cross bar 150 is carried by arms 152 pivoted to caps 167 secured by bolts 168 to the upper ends of the uprights 48, said arms being provided with stop screws 153 which engage said caps by which the position of said cross bar can be adjusted.

The upper cutters 34 are adjustably secured to their shaft 154 by means of set screws 155 (Figs. 14 and 15) which engage bearing blocks 156 seated in a longitudinal groove 157 in said shaft. By loosening the set screws 155, the cutters 34 can be adjusted longitudinally of the shaft 154 in accordance with the width of the cards C to be cut. The lower cutters 35 are splined to their shaft 158 so as to rotate therewith but move freely longitudinally thereof by means of keys 260 seated in a longitudinal groove 159 in said shaft and received in notches in the interior surfaces of said cutters. The cutters 35 are pressed laterally against the cutters 34, so as to cooperate with the latter to produce a shearing cut, by means of spring fingers 160 having at their ends bearing blocks 161 which engage the lateral faces of said cutters, said spring fingers being adjustably secured by clamps 162 to a rod 163 supported at its ends in the uprights 48. Also adjustably secured, as by clamps 169, to the rod 163, adjacent the end cutters 35 of the series, are trim turners 170 for deflecting the scrap or waste D downwardly, whereby it may be discharged at a convenient point. The cutter shafts 154 and 158 are journalled at their ends in boxes 164 mounted in vertical slots 165 in the uprights 48 and secured in place by set screws 166 in the caps 167, said shafts being provided upon their ends with intermeshing gears 171 whereby said shafts are rotated in unison in opposite directions.

The auxiliary frame 51 for the delivery mechanism comprises side or end members 172 connected by cross members 173, 174 and 175. The delivery rolls 39, 40, 39a and 40a are journalled in the side members 172, the axes of the lower rolls 40 and 40a of the respective sets being fixed while the shafts or trunnions for the upper rolls 39 and 39a are received in slots 176 in the side members 172, whereby said rolls are permitted to rest by gravity upon the rolls 40 and 40a. The planes of the axes of the two rolls of each set are preferably inclined in opposite directions to the vertical, so as to permit said rolls to cooperate more efficiently with the deflectors 37, 38 and 37a, 38a, respectively, in receiving the cards therefrom, said cards as they are received from said rolls upon the conveyors 41 and 42 being pressed into engagement with the latter by yielding fingers 177.

The deflectors 37, 38, 37a and 38a are preferably of the substantially H-shaped form shown most clearly in Fig. 17 and are provided with spring fingers or clips 178 whereby the deflectors 38 and 38a are adjustably secured to flanges on the upper and lower cross members 173 and 175 respectively, and the deflectors 37 and 37a are similarly secured to opposite, relatively angularly disposed faces of a bar 5 secured to the intermediate cross member 174. Said deflectors are disposed and adjusted on said cross members and bar in accordance with the adjustment of the cutters 34, the deflectors 38 and 38a being preferably disposed with their forward ends in lateral engagement with the cutters 34 and 35 respectively, or closely adjacent thereto, in order to act as strippers for disengaging the cards from the said cutters.

As above stated the auxiliary frame 51 is pivoted to the uprights 49, permitting said frame and the delivery mechanism carried thereby to be turned backwardly upon its pivot, as shown in Fig. 19, in which position it rests upon supporting surfaces 179 at the upper ends of the uprights 49, thereby affording convenient access to the cutters and deflectors for the purpose of adjusting the same. For convenience in manipulating the frame 51, one of the end members 172 thereof may be provided with a suitable handle 261.

Referring to Fig. 1, the collecting mechanism is carried by an auxiliary frame independently supported on the floor by uprights 180 and 181 and comprises two spaced parallel tables 182 and 183, the table 182 being directly supported upon the upper ends of the uprights 180 and 181, and the table 183 being spaced and supported from the table 182 by blocks 184. The table 183 is detachably secured to said blocks 184 by pins 185. The collecting table 43 is supported by suitable brackets 186 from the table 182, while the collecting table 44 is supported by a bracket 187 connecting cantilever members 188 which extend rearwardly from the uprights 180. The fingers or pressers 177 are carried by rock shafts 189 journalled in brackets 190 extending upwardly from the tables 182 and 183, said rock shafts having arms 191 connected by springs 192 with said tables. The conveyor 41 passes about rollers 193 and 194 journalled in suitable bearings at the ends of the table 183, while the conveyor 42 similarly passes about rollers 195 and 196 journalled in suitable bearings at the opposite ends of the table 182, the rollers 194 and 196 being in close proximity to the collecting tables 43 and 44, respectively.

Referring particularly to Fig. 3, the shafts 197 and 198 of the rollers 193 and 195 are provided with ratchets 199 and 200 cooperating with pawls 201 and 202 on pawl carriers 202 and 204 hung on said shafts and provided with arms 205 and 206 connected by a link 207. The arm 206 of the pawl carrier 204 is connected by a link 208 to a crank arm 209 on a shaft 210 journalled in a bracket 211 carried by one of the legs 45. The link 208 is preferably detachably connected with the arm 206 to permit the collecting mechanism to be removed from the remainder of the machine when desired. The detachable connection preferably comprises a pin 212 and a telescoping sleeve 213 received in a suitable opening in the arm 206 and normally held in engagement with said opening by a spring 214 (Fig. 5), said sleeve being capable of being slid back on the pin 212, against the tension of the spring 214, and out of the opening, to permit the pin 212 to be moved laterally out of said opening through a notch 215, (Figs. 2 and 19). The shaft of the rear roller 196 of the lower conveyor 42 is preferably provided with a hand crank 216 (Fig. 1) to permit the upper reach of said conveyor and the cards thereon to be manually withdrawn from beneath the table 183 when the machine is stopped.

The brackets 186 and 187, in addition to supporting the collecting tables 43 and 44 preferably also support evening and packing tables 217 and 218 upon the former of which the cards collected from the conveyors by the collector tables may be manually bunched for packing in boxes on the latter.

The uprights 181 of the collector mechanism frame are preferably provided with rollers or wheels 219, while the cantilever projections 188 are provided with handles 220, whereby the whole collector mechanism may be moved away from the machine to permit the turning of the delivery mechanism frame 51 into the position shown in Fig. 19 for the purpose above explained. Said collector mechanism may be moved entirely away from the machine in order to render the cutters and collector mechanism more fully accessible by disconnecting the link 208 from the arm 206 as above described. The collector mechanism is normally held in operative position by means of clamps 262 which connect brackets 263 on the uprights 181 with a flange 264 on the bed 46.

Power is supplied to the machine from any suitable source, preferably by an electric motor 221 (Figs. 1, 2 and 4) supported on the cross member or rod 141. The armature shaft of the motor 221 is connected by a belt 222 with a pulley 223 on a shaft 224 journalled at its inner end in an enlargement 225 (Fig. 19) on one of the uprights 48 and at its outer end in a bracket 226 secured to the adjacent standard 45. The shaft 224 is provided with a gear 227 which meshes with the gear 171 on the lower cutter shaft and actuates the cutters, and with a sprocket 228 connected by a chain 229 with a sprocket 230 on the shaft 210 for rotating the latter. The lower cutter shaft is provided with a pulley 231 (Figs. 4, 6 and 8) connected by a belt 232 having a suitable belt tightener 233 with a pulley 234 loose on the cam shaft 117 and adapted to be connected therewith by a clutch 235 operated by a suitable clutch controller 236. The lower cutter shaft is also provided with a hand wheel 250 by which the machine may be manually operated. As above explained, the cam shaft 117 actuates the pusher 33 through the cam 145 and also operates the feed rolls 29 and 30 through the crank disk 116. Said cam shaft is also provided with a sprocket 237 connected by a chain 238 with a sprocket 239 on the shaft of the lower feed roll 31, a suitable chain tightener 9 pivoted on the cam shaft 117 being preferably provided whereby to provide sufficient slack in the chain 238 to permit the adjustments above described of the strip supplying mechanism as a whole. The shaft 210 is connected by gears 240 (see particularly Figs. 2 and 5) with a shaft 241 extending across the machine and journalled at one end in the bracket 211 and at its opposite end in a bracket 242 (Fig. 8) carried by the standard 45 in the opposite side of the machine. The shaft 241 is provided with a sprocket 243 about which passes a chain 244 which likewise passes about sprockets 245 on the shafts of the lower delivery rolls 40 and 40a of the two sets, whereby said rolls are positively driven. The sprocket chain 244 is provided with a spring operated chain tightener 246 in order to permit sufficient slack in said chain to permit the delivery mechanism to be turned into its operative position as shown in Fig. 8 or into the adjusting position shown in Fig. 19.

When the machine is to be put into operation, the various instrumentalities are first adjusted in accordance with the type of stock to be used and the particular size and thickness of the cards to be cut therefrom. With the collecting mechanism moved back and the delivery mechanism tipped into the position shown in Fig. 19, the cutters, deflectors and trim turners are adjusted in accordance with the width of the cards and the length of the strips from which they are cut, after which the delivery and collecting mechanisms are returned to their normal positions. The end uprights 25 of the hopper are set on the flange 66 in accordance with the length of the strips, and the gates 26 adjusted by the screws 70 in accordance with the thickness of said strips. The strip supplying mechanism as a whole is adjusted by means of the hand wheel 63 in accordance with the width of the strips, so as to provide for the proper distance between the feed rolls 31 and the cutters in order that the strips may be properly supplied to the feed table 32 in advance of the cutters and at the rear of the pusher 33. Said pusher is likewise adjusted on its actuating slide 132 for the same purpose, and the cam 145 suitably adjusted to provide for the proper timing of said pusher. The feed roll 30 is adjusted horizontally, by means of the hand wheel 90, in accordance with the width of the strips, and vertically, by means of the hand wheel 83, in accordance with the surface characteristics of the stock, as above explained.

A stack E of strips A is then supplied to the hopper, a strip of contrasting color being preferably inserted at suitable intervals, say between every 100 strips, in order to facilitate the gathering of the cut cards C from the collecting tables 43 and 44 in predetermined quantities. The machine is then started by closing the switch (not shown) which controls the motor 221. This puts into operation all of the mechanisms of the machine with the exception of the strip supplying mechanism. The latter mechanism is started by engaging the clutch 235 by means of the clutch controller 236, which puts the feed rollers 29, 30 and 31 and the pusher 33 into operation. The strips are thereupon fed from the bottom of the stack in the hopper by the feed rolls 29 and 30 and deposited by the feed rolls 31 on the feed table 32 in the rear of the pusher 33, which, with the assistance of the spring fingers 36, serves to square said strips with respect to the cutters and puts them into engagement with the latter. The individual cards into which the strips are divided by the cutters are displaced by the latter alternately in opposite directions and are directed by the deflectors to the delivery rolls which deliver them to the conveyors 41 and 42 by which they are carried to and collected by the collecting tables 43 and 44.

We claim:

1. In a card cutting machine, in combination, a hopper adapted to receive a stack of strips of card stock and having an upright gate at its delivery side, means spaced from the lower end of said gate for forming with the latter a discharge opening for single strips, a feed roller positioned to support said stack at the side opposite said gate, and means for positively rotating said roller to force strips from the bottom of said stack into said discharge opening.

2. In a card cutting machine, in combination, a hopper adapted to receive a stack of strips of card stock and having an upright gate at its delivery side, a feed roller spaced from the lower end of said gate for forming with the latter a discharge opening for single strips, a second feed roller positioned to support said stack at the side opposite said gate, and means for positively rotating both of said rollers to feed strips from the bottom of said stack through said discharge opening.

3. In a card cutting machine, in combination, a hopper adapted to receive a stack of strips of card stock and having an upright gate at its delivery side, a feed roller spaced from the lower end of said gate for forming with the latter a discharge opening for single strips, a second feed roller positioned to support said stack at the side opposite said gate, and means including racks and pinions and one-way driving connections for intermittently rotating said rollers to feed strips from the bottom of said stack through said discharge opening.

4. In a card cutting machine, the combination with mechanism for supporting a stack of strips of card stock and for feeding said strips singly from the bottom of said stack, of means for adjusting said mechanism to vary the inclination from the horizontal at which said strips are supported in accordance with the frictional character of the surfaces of said stock.

5. In a card cutting machine, in combination, a hopper adapted to receive a stack of strips of card stock and having at its bottom a lateral discharge opening for single strips, a feed roller positioned to support said stack at the side opposite said opening, means for adjusting the position of said roller with reference to said discharge opening, and means for rotating said roller to feed strips from the bottom of said stack through said discharge opening.

6. In a card cutting machine, in combination, a hopper adapted to receive a stack of strips of card stock and having at its bottom a lateral discharge opening for single strips, a feed roller positioned to support said stack at the side opposite said opening, means for adjusting the position of said roller with reference to said discharge opening, and means including a rack and pinion and a one-way driving connection for intermittently rotating said roller to feed strips from the bottom of said stack through said discharge opening.

7. In a card cutting machine, in combination, a hopper adapted to receive a stack of strips of card stock and having at its delivery side an upright gate provided with an outwardly bevelled lower end, means spaced from said lower end for forming therewith a discharge opening for single strips, a feed roller positioned to support said stack at the side opposite said gate, and means for rotating said roller to force the strips adjacent the bottom of the stack against said bevelled end and to feed said strips singly from the bottom of said stack through said discharge opening.

8. In a card cutting machine, in combination, a hopper adapted to receive a stack of strips of card stock and having an upright gate at its delivery side, said gate having an outwardly bevelled lower end, a feed roller spaced from the lower end of said gate for forming with the latter a discharge opening for single strips, a second feed roller positioned to support said stack at the side opposite said gate, and means for intermittently rotating both of said rollers to feed strips from the bottom of said stack through said discharge opening, said rotating means being constructed and arranged to rotate said second feed roller in advance of said first-named feed roller.

9. In a card cutting machine, in combination, a series of cutters, a feed table over which strips of card stock are presented to said cutters, a pusher for advancing said strips laterally across said table to said cutters, and strip supplying mechanism including a hopper adapted to receive a stack of strips and means for feeding said strips laterally from said hopper and delivering them to said feed table adjacent said pusher.

10. In a card cutting machine, in combination, a series of cutters, a feed table over which strips of card stock are presented to said cutters, a pusher for advancing said strips laterally across said table to said cutters, strip supplying mechanism including a hopper adapted to receive a stack of strips and means for feeding said strips laterally from said hopper and delivering them to said feed table adjacent said pusher, and a frame by which said strip supplying mechanism is carried, said frame being adjustable with reference to said cutters and pusher.

11. In a card cutting machine, in combination, a series of cutters, a feed table over which strips are presented to said cutters, a pusher for advancing strips laterally across said table to said cutters, strip supplying mechanism including a hopper adapted to receive a stack of strips, and means for feeding said strips laterally from said hopper and delivering them to said feed table adjacent said pusher, and means whereby the stroke of said pusher may be varied.

12. In a card cutting machine, in combination, a series of cutters, a feed table over which strips are presented to said cutters, a pusher for advancing strips laterally across said table to said cutters, strip supplying mechanism including a hopper adapted to receive a stack of strips and means for feeding said strips laterally from said hopper and delivering them to said feed table adjacent said pusher, a frame by which said strip supplying mechanism is carried, said frame being adjustable with reference to said cutters and pusher, and means whereby the stroke of said pusher may be varied.

13. In a card cutting machine, the combination with a series of cutting instrumentalities for cutting stock into a series of cards and comprising two parallel coacting series of coaxial rotary cutters, the several cutters of one series coacting with those of the other to effect a shearing cut and engaging the same alternately at opposite sides, whereby alternate cards of the series are displaced in opposite directions from the original plane of the strip as they are cut, of means for directing said alternate cards in different paths as they leave said cutters.

14. In a card cutting machine, in combination, a series of cutting instrumentalities for cutting stock into a series of cards and comprising two parallel shafts provided with coacting rotary cutters longitudinally adjustable thereon, deflectors for directing adjacent cards of the series in different paths as they leave said cutters, and a frame in which said deflectors are adjustable in accordance with the adjustment of said cutters, said frame being movable away from said cutters to render said cutters and deflectors accessible for purposes of adjustment.

15. In a card cutting machine, in combination, a series of cutting instrumentalities for cutting stock into a series of cards and comprising two parallel shafts provided with coacting rotary cutters longitudinally adjustable thereon, a collecting unit including a plurality of conveyors, and a delivery unit including a plurality of sets of feed rolls to deliver cards to said conveyors respectively and deflectors for directing adjacent cards of the series to different sets of feed rolls as they leave the cutters, said deflectors being adjustable in said delivery unit in accordance with the adjustment of said cutters, said collecting unit being movable away from said delivery unit, and said delivery unit being movable away from said cutters to render said cutters and deflectors accessible for purposes of adjustment.

16. In a machine having card cutting mechanism, collecting mechanism for the cut cards comprising an endless conveyor having an upper stretch movable away from said cutting mechanism and a collecting table at the delivery end of said stretch inclined upwardly and in the direction of movement thereof and against which said cards are collected from said stretch in inclined superimposed relation.

17. In a card cutting machine, in combination, a hopper adapted to receive a stack of strips of card stock and having an upright gate at its delivery side, a feed roller spaced from the lower end of said gate for forming with the latter a discharge opening for single strips, a second feed roller positioned to support said stack at the side opposite said gate, and means for intermittently rotating said rollers, said rotating means being constructed and arranged to rotate said second feed roller in advance of said first-named feed roller.

18. In a card cutting machine, in combination, a hopper adapted to receive a stack of strips of card stock and having an upright gate at its delivery side, a feed roller having a yielding surface and spaced from the lower end of said gate a distance slightly less than the thickness of a strip for forming with the latter a restricted discharge opening for single strips, a second feed roller positioned to support said stack at the side opposite said gate, and means for intermittently rotating said rollers, said rotating means being constructed and arranged to rotate said second feed roller in advance of said first-named feed roller.

THEODORE A. SCHWAMB.
SIDNEY P. SMITH.